(12) United States Patent
Redmond et al.

(10) Patent No.: US 9,777,171 B1
(45) Date of Patent: *Oct. 3, 2017

(54) GRAPHENE COMPOSITIONS

(71) Applicant: VORBECK MATERIALS CORP., Jessup, MD (US)

(72) Inventors: Kate Redmond, Baltimore, MD (US); Dan F Scheffer, Frederick, MD (US); Christy V. Martin, Edgewater, MD (US)

(73) Assignee: VORBECK MATERIALS CORP., Jessup, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/229,685

(22) Filed: Aug. 5, 2016

Related U.S. Application Data

(63) Continuation of application No. 13/079,001, filed on Apr. 3, 2011, now Pat. No. 9,434,834.

(51) Int. Cl.
| | |
|---|---|
| *C09D 11/037* | (2014.01) |
| *C09D 11/107* | (2014.01) |
| *C09D 11/033* | (2014.01) |
| *C09D 11/106* | (2014.01) |
| *C09D 11/52* | (2014.01) |
| *C08J 7/04* | (2006.01) |
| *C08K 3/04* | (2006.01) |
| *C08K 3/08* | (2006.01) |

(52) U.S. Cl.
CPC ............ *C09D 11/037* (2013.01); *C08J 7/047* (2013.01); *C09D 11/033* (2013.01); *C09D 11/106* (2013.01); *C09D 11/107* (2013.01); *C09D 11/52* (2013.01); *C08J 2367/02* (2013.01); *C08J 2429/14* (2013.01); *C08J 2433/10* (2013.01); *C08K 3/04* (2013.01); *C08K 3/08* (2013.01); *C08K 2003/0806* (2013.01); *C08K 2201/001* (2013.01); *C08K 2201/006* (2013.01)

(58) Field of Classification Search
CPC ... C09D 11/037; C09D 11/033; C09D 11/106; C09D 11/1007; C09D 11/52; C08J 7/047
See application file for complete search history.

(56) References Cited

FOREIGN PATENT DOCUMENTS

| | | | | |
|---|---|---|---|---|
| WO | WO 2009/123771 | * | 10/2009 | ............ H01L 51/00 |

* cited by examiner

Primary Examiner — John Uselding
(74) Attorney, Agent, or Firm — Trentice Bolar

(57) ABSTRACT

Compositions comprising graphene sheets, graphite, at least one binder, a carrier system. About 1 to about 50 weight percent of the carrier system comprises at least one of a cyclic imide and lactone. The graphene sheets consist of fully exfoliated single sheets of graphite. The ratio by weight of graphite to graphene sheets is from about 50:50 to about 85:15. The composition may be used as coatings and inks.

14 Claims, No Drawings

GRAPHENE COMPOSITIONS

REFERENCE TO RELATED APPLICATIONS

The present application claims priority to U.S. Provisional Application No. 61/320,732, filed Apr. 3, 2010, and U.S. Utility patent application Ser. No. 13/079,001, filed Apr. 3, 2011, the entire contents of which are herein incorporated by reference in their entirety.

FIELD OF THE INVENTION

The present invention relates to compositions comprising graphene sheets.

BACKGROUND

Surface coatings can be used to impart articles with desirable properties that are not possessed by the articles themselves or not possessed in a sufficient degree. For example, there are myriad applications for which it would be desirable to use electrically conductive and/or thermally conductive components having good physical properties. Because of their intrinsic conductivities and frequently advantageous physical properties, metals are often useful for such applications but can have drawbacks, including increased weight, cost, and that they can be difficult and/or inconvenient to form into a variety of shapes, including intricate parts. Furthermore, metallic coatings can require high curing temperatures and/or prolonged curing times, which can be harmful to many substrates, such as some papers, polymers, adhesives, etc.

Many of these drawbacks can be overcome by the use of polymeric materials, which can have cost, weight, processability, and flexibility of design advantages over metals. However, most polymeric materials are not intrinsically conductive enough for many applications and conductive additives must often be used to achieve the desired properties. High loadings are often required to get useful conductivities, which can be to the detriment of physical and other properties of the materials and can interfere with the processability of the polymers. Furthermore, many polymer-based coatings require curing conditions (such temperatures and times) that are also incompatible with many substrates. It would therefore be desirable to obtain polymer based compositions that have improved conductivity.

SUMMARY OF THE INVENTION

Disclosed and claimed herein are compositions comprising graphene sheets, at least one binder, and a carrier system, wherein about 1 to about 50 weight percent of the carrier system comprises at least one cyclic amide, cyclic imide, and/or lactone. Further disclosed and claimed are a method of coating a substrate, comprising applying to a surface of the substrate at least one ink or coating comprising graphene sheets, at least one lactone and/or at least one cyclic amide, and at least one binder and articles comprising a surface coated with at least one ink or coating comprising graphene sheets, at least one lactone and/or at least one cyclic amide, and at least one binder.

DETAILED DESCRIPTION OF THE INVENTION

The compositions comprise graphene sheets, at least one binder, and a carrier system that comprises at least one cyclic amide, cyclic imide, and/or lactone. The compositions may be in the form of inks or coatings.

The cyclic amides, cyclic imides, and lactones preferably have boiling points of no greater than about 300° C., or more preferably of no greater than about 250° C., or yet more preferably of no greater than about 220° C. Examples of cyclic amides include N-methylpyrrolidone (N-methyl-2-pyrrolidone), pyrrolidone, etc. Examples of lactones include, but are not limited to, lactones with 4- to 8-membered rings. Examples of lactones include beta-propiolactone, gamma-valerolactone, delta-valerolactone, gamma-butyrolactone, epsilon-caprolactone, etc. Examples of cyclic imides include imidazolidinones such as N,N'-dimethylimidazolidinone (1,3-dimethyl-2-imidazolidinone).

There are no particular limitations to the components that comprise the remainder of the carrier system. Examples of suitable carriers include, but are not limited to, one or more of water, organic solvents, distilled or synthetic isoparaffinic hydrocarbons (such Isopar® and Norpar® (both manufactured by Exxon) and Dowanol® (manufactured by Dow), citrus terpenes and mixtures containing citrus terpenes (such as Purogen, Electron, and Positron (all manufactured by Ecolink)), terpenes and terpene alcoholds (including terpineols, including alpha-terpineol), limonene, aliphatic petroleum distillates, alcohols (such as methanol, ethanol, n-propanol, i-propanol, n-butanol, butanol, sec-butanol, tert-butanol, pentanols, i-amyl alcohol, hexanols, heptanols, octanols, diacetone alcohol, butyl glycol, etc.), ketones (such as acetone, methyl ethyl ketone, cyclohexanone, i-butyl ketone, 2,6,8,trimethyl-4-nonanone etc.), esters (such as methyl acetate, ethyl acetate, n-propyl acetate, i-propyl acetate, n-butyl acetate, i-butyl acetate, tert-butyl acetate, carbitol acetate, etc.), glycol ethers, ester and alcohols (such as 2-(2-ethoxyethoxy)ethanol, propylene glycol monomethyl ether and other propylene glycol ethers; ethylene glycol monobutyl ether, 2-methoxyethyl ether (diglyme), propylene glycol methyl ether (PGME); and other ethylene glycol ethers; ethylene and propylene glycol ether acetates, diethylene glycol monoethyl ether acetate, 1-methoxy-2-propanol acetate (PGMEA); and hexylene glycol (such as Hexasol™ (supplied by SpecialChem)), imides, amides (such as dimethylacetamide), dibasic esters (such as dimethyl succinate, dimethyl glutarate, dimethyl adipate), etc. Solvents may be low- or non-VOC solvents, non-hazardous air pollution solvents, and non-halogenated solvents.

The cyclic amide, cyclic imide, and/or lactone component comprises from about 0.1 to about 50 weight percent of the carrier systems. In some embodiments, the cyclic amide, cyclic imide, and/or lactone component may comprise from about 0.1 to about 40 percent, or from about 0.1 to about 30 percent, or from about 1 to about 50 percent, or from about 1 to about 40 percent, or from about 1 to about 30 percent, or from about 1 to about 25 percent, or from about 1 to about 20 percent, or from about 1 to about 15 percent, or from about 1 to about 10 percent, or from about 5 to about 50 percent, or from about 5 to about 40 percent, from about 5 to about 30 percent, or from about 5 to about 20 percent, or from about 5 to about 10 percent, or from about 3 to about 10 percent, or from about 3 to about 20 percent of the carrier system, or from about 3 to about 30 percent, or from about 3 to about 40 percent, or from about 3 to about 50 percent, or from about 2 to about 10 percent, or from about 2 to about 20 percent, or from about 2 to about 30 percent, or from about 2 to about 40 percent, or from about 2 to about 50 percent of the carrier system, where all percentages are weight percentages.

The graphene sheets are graphite sheets preferably having a surface area of from about 100 to about 2630 m$^2$/g. In some embodiments, the graphene sheets primarily, almost completely, or completely comprise fully exfoliated single sheets of graphite (these are approximately 1 nm thick and are often referred to as "graphene"), while in other embodiments, at least a portion of the graphene sheets may comprise at partially exfoliated graphite sheets, in which two or more sheets of graphite have not been exfoliated from each other. The graphene sheets may comprise mixtures of fully and partially exfoliated graphite sheets.

Graphene sheets may be made using any suitable method. For example, they may be obtained from graphite, graphite oxide, expandable graphite, expanded graphite, etc. They may be obtained by the physical exfoliation of graphite, by for example, peeling off sheets graphene sheets. They may be made from inorganic precursors, such as silicon carbide. They may be made by chemical vapor deposition (such as by reacting a methane and hydrogen on a metal surface). They may be may by the reduction of an alcohol, such ethanol, with a metal (such as an alkali metal like sodium) and the subsequent pyrolysis of the alkoxide product (such a method is reported in *Nature Nanotechnology* (2009), 4, 30-33). They may be made by the exfoliation of graphite in dispersions or exfoliation of graphite oxide in dispersions and the subsequently reducing the exfoliated graphite oxide. Graphene sheets may be made by the exfoliation of expandable graphite, followed by intercalation, and ultrasonication or other means of separating the intercalated sheets (see, for example, *Nature Nanotechnology* (2008), 3, 538-542). They may be made by the intercalation of graphite and the subsequent exfoliation of the product in suspension, thermally, etc.

Graphene sheets may be made from graphite oxide (also known as graphitic acid or graphene oxide). Graphite may be treated with oxidizing and/or intercalating agents and exfoliated. Graphite may also be treated with intercalating agents and electrochemically oxidized and exfoliated. Graphene sheets may be formed by ultrasonically exfoliating suspensions of graphite and/or graphite oxide in a liquid (which may contain surfactants and/or intercalants). Exfoliated graphite oxide dispersions or suspensions can be subsequently reduced to graphene sheets. Graphene sheets may also be formed by mechanical treatment (such as grinding or milling) to exfoliate graphite or graphite oxide (which would subsequently be reduced to graphene sheets).

Reduction of graphite oxide to graphene may be by means of chemical reduction and may be carried out in graphite oxide in a solid form, in a dispersion, etc. Examples of useful chemical reducing agents include, but are not limited to, hydrazines (such as hydrazine, N,N-dimethylhydrazine, etc.), sodium borohydride, citric acid, hydroquinone, isocyanates (such as phenyl isocyanate), hydrogen, hydrogen plasma, etc. A dispersion or suspension of exfoliated graphite oxide in a carrier (such as water, organic solvents, or a mixture of solvents) can be made using any suitable method (such as ultrasonication and/or mechanical grinding or milling) and reduced to graphene sheets.

Graphite oxide may be produced by any method known in the art, such as by a process that involves oxidation of graphite using one or more chemical oxidizing agents and, optionally, intercalating agents such as sulfuric acid. Examples of oxidizing agents include nitric acid, sodium and potassium nitrates, perchlorates, hydrogen peroxide, sodium and potassium permanganates, phosphorus pentoxide, bisulfites, etc. Preferred oxidants include $KClO_4$; $HNO_3$ and $KClO_3$; $KMnO_4$ and/or $NaMnO_4$; $KMnO_4$ and $NaNO_3$; $K_2S_2O_8$ and $P_2O_5$ and $KMnO_4$; $KMnO_4$ and $HNO_3$; and $HNO_3$. Preferred intercalation agents include sulfuric acid. Graphite may also be treated with intercalating agents and electrochemically oxidized. Examples of methods of making graphite oxide include those described by Staudenmaier (*Ber. Stsch. Chem. Ges.* (1898), 31, 1481) and Hummers (*J. Am. Chem. Soc.* (1958), 80, 1339).

One example of a method for the preparation of graphene sheets is to oxidize graphite to graphite oxide, which is then thermally exfoliated to form graphene sheets (also known as thermally exfoliated graphite oxide), as described in US patent application publication 2007/0092432, the disclosure of which is incorporated herein by reference. The thusly formed graphene sheets may display little or no signature corresponding to graphite or graphite oxide in their X-ray-diffraction pattern.

The thermal exfoliation may be carried out in a continuous, semi-continuous batch, etc. process.

Heating can be done in a batch process or a continuous process and can be done under a variety of atmospheres, including inert and reducing atmospheres (such as nitrogen, argon, and/or hydrogen atmospheres). Heating times can range from under a few seconds or several hours or more, depending on the temperatures used and the characteristics desired in the final thermally exfoliated graphite oxide. Heating can be done in any appropriate vessel, such as a fused silica, mineral, metal, carbon (such as graphite), ceramic, etc. vessel. Heating may be done using a flash lamp.

During heating, the graphite oxide may be contained in an essentially constant location in single batch reaction vessel, or may be transported through one or more vessels during the reaction in a continuous or batch mode. Heating may be done using any suitable means, including the use of furnaces and infrared heaters.

Examples of temperatures at which the thermal exfoliation of graphite oxide may be carried out are at least about 300° C., at least about 400° C., at least about 450° C., at least about 500° C., at least about 600° C., at least about 700° C., at least about 750° C., at least about 800° C., at least about 850° C., at least about 900° C., at least about 950° C., and at least about 1000° C. Preferred ranges include between about 750 about and 3000° C., between about 850 and 2500° C., between about 950 and about 2500° C., and between about 950 and about 1500° C.

The time of heating can range from less than a second to many minutes. For example, the time of heating can be less than about 0.5 seconds, less than about 1 second, less than about 5 seconds, less than about 10 seconds, less than about 20 seconds, less than about 30 seconds, or less than about 1 min. The time of heating can be at least about 1 minute, at least about 2 minutes, at least about 5 minutes, at least about 15 minutes, at least about 30 minutes, at least about 45 minutes, at least about 60 minutes, at least about 90 minutes, at least about 120 minutes, at least about 150 minutes, at least about 240 minutes, from about 0.01 seconds to about 240 minutes, from about 0.5 seconds to about 240 minutes, from about 1 second to about 240 minutes, from about 1 minute to about 240 minutes, from about 0.01 seconds to about 60 minutes, from about 0.5 seconds to about 60 minutes, from about 1 second to about 60 minutes, from about 1 minute to about 60 minutes, from about 0.01 seconds to about 10 minutes, from about 0.5 seconds to about 10 minutes, from about 1 second to about 10 minutes, from about 1 minute to about 10 minutes, from about 0.01 seconds to about 1 minute, from about 0.5 seconds to about 1 minute, from about 1 second to about 1 minute, no more than about 600 minutes, no more than about 450 minutes, no more than about 300 minutes, no more than about 180 minutes, no more than about 120 minutes, no more than about 90 minutes, no more than about 60 minutes, no more than about 30 minutes, no more than about 15 minutes, no more than about 10 minutes, no more than about 5 minutes, no more than about 1 minute, no more than about 30 seconds, no more than about 10 seconds, or no more than about 1 second. During the course of heating, the temperature may vary.

Examples of the rate of heating include at least about 120° C./min, at least about 200° C./min, at least about 300° C./min, at least about 400° C./min, at least about 600° C./min, at least about 800° C./min, at least about 1000° C./min, at least about 1200° C./min, at least about 1500° C./min, at least about 1800° C./min, and at least about 2000° C./min.

Graphene sheets may be annealed or reduced to graphene sheets having higher carbon to oxygen ratios by heating under reducing atmospheric conditions (e.g., in systems purged with inert gases or hydrogen). Reduction/annealing temperatures are preferably at least about 300° C., or at least about 350° C., or at least about 400° C., or at least about 500° C., or at least about 600° C., or at least about 750° C., or at least about 850° C., or at least about 950° C., or at least about 1000° C. The temperature used may be, for example, between about 750 about and 3000° C., or between about 850 and 2500° C., or between about 950 and about 2500° C.

The time of heating can be for example, at least about 1 second, or at least about 10 second, or at least about 1 minute, or at least about 2 minutes, or at least about 5 minutes. In some embodiments, the heating time will be at least about 15 minutes, or about 30 minutes, or about 45 minutes, or about 60 minutes, or about 90 minutes, or about 120 minutes, or about 150 minutes. During the course of annealing/reduction, the temperature may vary within these ranges.

The heating may be done under a variety of conditions, including in an inert atmosphere (such as argon or nitrogen) or a reducing atmosphere, such as hydrogen (including hydrogen diluted in an inert gas such as argon or nitrogen), or under vacuum. The heating may be done in any appropriate vessel, such as a fused silica or a mineral or ceramic vessel or a metal vessel. The materials being heated including any starting materials and any products or intermediates) may be contained in an essentially constant location in single batch reaction vessel, or may be transported through one or more vessels during the reaction in a continuous or batch reaction. Heating may be done using any suitable means, including the use of furnaces and infrared heaters.

The graphene sheets preferably have a surface area of at least about 100 m$^2$/g to, or of at least about 200 m$^2$/g, or of at least about 300 m$^2$/g, or of least about 350 m$^2$/g, or of least about 400 m$^2$/g, or of least about 500 m$^2$/g, or of least about 600 m$^2$/g., or of least about 700 m$^2$/g, or of least about 800 m$^2$/g, or of least about 900 m$^2$/g, or of least about 700 m$^2$/g. The surface area may be about 400 to about 1100 m$^2$/g. The theoretical maximum surface area can be calculated to be 2630 m$^2$/g. The surface area includes all values and subvalues therebetween, especially including 400, 500, 600, 700, 800, 900, 1000, 1100, 1200, 1300, 1400, 1500, 1600, 1700, 1800, 1900, 2000, 2100, 2200, 2300, 2400, 2500, and 2630 m$^2$/g.

The graphene sheets can have number average aspect ratios of about 100 to about 100,000, or of about 100 to about 50,000, or of about 100 to about 25,000, or of about 100 to about 10,000 (where "aspect ratio" is defined as the ratio of the longest dimension of the sheet to the shortest).

Surface area can be measured using either the nitrogen adsorption/BET method at 77 K or a methylene blue (MB) dye method in liquid solution.

The dye method is carried out as follows: A known amount of graphene sheets is added to a flask. At least 1.5 g of MB are then added to the flask per gram of graphene sheets. Ethanol is added to the flask and the mixture is ultrasonicated for about fifteen minutes. The ethanol is then evaporated and a known quantity of water is added to the flask to re-dissolve the free MB. The undissolved material is allowed to settle, preferably by centrifuging the sample. The concentration of MB in solution is determined using a UV-vis spectrophotometer by measuring the absorption at $\lambda_{max}$=298 nm relative to that of standard concentrations.

The difference between the amount of MB that had been initially added and the amount present in solution as determined by UV-vis spectrophotometry is assumed to be the amount of MB that has been adsorbed onto the surface of the graphene sheets. The surface area of the graphene sheets are then calculated using a value of 2.54 m$^2$ of surface covered per one mg of MB adsorbed.

The graphene sheets may have a bulk density of from about 0.1 to at least about 200 kg/m$^3$. The bulk density includes all values and subvalues therebetween, especially including 0.5, 1, 5, 10, 15, 20, 25, 30, 35, 50, 75, 100, 125, 150, and 175 kg/m$^3$.

The graphene sheets may be functionalized with, for example, oxygen-containing functional groups (including, for example, hydroxyl, carboxyl, and epoxy groups) and typically have an overall carbon to oxygen molar ratio (C/O ratio), as determined by elemental analysis of at least about 1:1, or more preferably, at least about 3:2. Examples of carbon to oxygen ratios include about 3:2 to about 85:15; about 3:2 to about 20:1; about 3:2 to about 30:1; about 3:2 to about 40:1; about 3:2 to about 60:1; about 3:2 to about 80:1; about 3:2 to about 100:1; about 3:2 to about 200:1; about 3:2 to about 500:1; about 3:2 to about 1000:1; about 3:2 to greater than 1000:1; about 10:1 to about 30:1; about 80:1 to about 100:1; about 20:1 to about 100:1; about 20:1 to about 500:1; about 20:1 to about 1000:1; about 50:1 to about 300:1; about 50:1 to about 500:1; and about 50:1 to about 1000:1. In some embodiments, the carbon to oxygen ratio is at least about 10:1, or at least about 20:1, or at least about 35:1, or at least about 50:1, or at least about 75:1, or at least about 100:1, or at least about 200:1, or at least about 300:1, or at least about 400:1, or at least 500:1, or at least about 750:1, or at least about 1000:1; or at least about 1500:1, or at least about 2000:1. The carbon to oxygen ratio also includes all values and subvalues between these ranges.

The graphene sheets may contain atomic scale kinks. These kinks may be caused by the presence of lattice defects in, or by chemical functionalization of the two-dimensional hexagonal lattice structure of the graphite basal plane.

The compositions may further comprise graphite (including natural, Kish, and synthetic, annealed, pyrolytic, highly oriented pyrolytic, etc. graphites). The ratio by weight of graphite to graphene sheets may be from about 2:98 to about 98:2, or from about 5:95 to about 95:5, or from about 10:90 to about 90:10, or from about 20:80 to about 80:20, or from about 30:70 to 70:30, or from about 40:60 to about 90:10, or from about 50:50 to about 85:15, or from about 60:40 to about 85:15, or from about 70:30 to about 85:15.

The graphene sheets may comprise two or more graphene powders having different particle size distributions and/or morphologies. The graphite may also comprise two or more graphite powders having different particle size distributions and/or morphologies.

The binders can be thermoplastics or thermosets and may be elastomers. Binders may also comprise monomers that can be polymerized before, during, or after the application of the ink or coating to the substrate. Polymeric binders may be crosslinked or otherwise cured after the ink or coating has been applied to the substrate. Examples of polymeric binders include polysiloxanes (such as poly(dimethylsiloxane), dimethylsiloxane/vinylmethylsiloxane copolymers, vinyldimethylsiloxane terminated poly(dimethylsiloxane), etc.), polyethers and glycols such as poly(ethylene oxide)s (also known as poly(ethylene glycol)s, poly(propylene oxide)s (also known as poly(propylene glycol)s, and ethylene oxide/propylene oxide copolymers, cellulosic resins (such as ethyl cellulose, ethyl hydroxyethyl cellulose, carboxymethyl cellulose, cellulose acetate, cellulose acetate propionates, and cellulose acetate butyrates, nitrocellulose), and poly(vinyl butyral), poly(vinyl acetate) and poly(vinyl acetate) copolymers, poly(vinyl pyrrolidone) and poly(vinyl pyrrolidone) copolymers, vinyl acetate and vinyl pyrrolidone copolymers, polyvinyl alcohol and its derivatives, ethylene/vinyl acetate polymers, acrylate polymers (such as methyl methacrylate polymers, methacrylate copolymers, polymers derived from one or more acrylates, methacrylates, ethyl acrylates, ethyl methacrylates, butyl acrylates, butyl methacrylates, glycidyl acrylates and methacrylates and the like), styrene/acrylic copolymers, styrene/maleic anhydride copolymers, isobutylene/maleic anhydride copolymers, vinyl acetate/ethylene copolymers, ethylene/acrylic acid copolymers, polyolefins, polystyrenes, olefin and styrene copolymers, epoxy resins, acrylic latex polymers, polyester acrylate oligomers and polymers, polyester diol diacrylate polymers, UV-curable resins, and polyamides. Polyamides may be polymers and copolymers (i.e., polyamides having at least two different repeat units) having melting points between about 100 and about 255° C., or between about 120 and about 255° C., or between about 110 and about 255° C. or between about 120 and about 255° C. These include aliphatic copolyamides having a melting point of about 230° C. or less, aliphatic copolyamides having a melting point of about 210° C. or less, aliphatic copolyamides having a melting point of about 200° C. or less, aliphatic copolyamides having a melting point of about 180° C. or less, of about 150° C. or less, of about 130° C. or less, of about 120° C. or less, of about 110° C. or less, etc. Examples of these include those sold under the trade names Macromelt by Henkel, Versamid by Cognis, and Elvamide® by DuPont. Examples of suitable polymers include Elvacite® polymers supplied by Lucite International, Inc., including Elvacite® 2009, 2010, 2013, 2014, 2016, 2028, 2042, 2045, 2046, 2550, 2552,2614, 2669, 2697, 2776, 2823, 2895, 2927, 3001, 3003, 3004, 4018, 4021, 4026, 4028, 4044, 4059, 4400, 4075, 4060, 4102, etc. Other polymer families include Bynel® polymers (such as Bynel® 2022 supplied by DuPont) and Joncryl® polymers (such as Joncryl® 678 and 682).

The graphene sheets and graphite, if present, are preferably present in the compositions in about 20 to about 98 weight percent, in about 30 to about 95 weight percent, in about 40 to about 95 weight percent, in about 50 to about 95 weight percent, and in about 70 to about 95 weight percent, based on the total amount of graphene sheets and graphite, if present, and binder.

The compositions may be made using any suitable method, including wet or dry methods and batch, semi-continuous, and continuous methods.

For example, components of the coatings, such as one or more of the graphene sheets, graphite (if used), binders, carriers, and/or other components may be processed (e.g., milled/ground, blended, etc. by using suitable mixing, dispersing, and/or compounding techniques and apparatus, including ultrasonic devices, high-shear mixers, ball mills, attrition equipment, sandmills, two-roll mills, three-roll mills, cryogenic grinding crushers, extruders, kneaders, double planetary mixers, triple planetary mixers, high pressure homogenizers, ball mills, attrition equipment, sandmills, horizontal and vertical wet grinding mills, etc. Processing (including grinding) technologies can be wet or dry and can be continuous or discontinuous. Suitable materials for use as grinding media include metals, carbon steel, stainless steel, ceramics, stabilized ceramic media (such as yttrium stabilized zirconium oxide), PTFE, glass, tungsten carbide, etc. Methods such as these can be used to change the particle size and/or morphology of the graphite, graphene sheets, other components, and blends or two or more components.

Components may be processed together or separately and may go through multiple processing (including mixing/blending) stages, each involving one or more components (including blends).

There is no particular limitation to the way in which the graphene sheets, graphite (if used), and other components are processed and combined. For example, graphene sheets and/or graphite may be processed into given particle size distributions and/or morphologies separately and then combined for further processing with or without the presence of additional components. Unprocessed graphene sheets and/or graphite may be combined with processed graphene sheets and/or graphite and further processed with or without the presence of additional components. Processed and/or unprocessed graphene sheets and/or processed and/or unprocessed graphite may be combined with other components, such as one or more binders and then combined with processed and/or unprocessed graphene sheets and/or processed and/or unprocessed graphite. Two or more combinations of processed and/or unprocessed graphene sheets and/or processed and/or unprocessed graphite that have been combined with other components may be further combined or processed.

In one embodiment, if a multi-chain lipid is used, it is added to graphene sheets (and/or graphite if present) before processing.

After blending and/or grinding steps, additional components may be added to the compositions, including, but not limited to, thickeners, viscosity modifiers, binders, etc. The compositions may also be diluted by the addition of more carrier.

The compositions may optionally comprise one or more additional additives, such as dispersion aids (including surfactants, emulsifiers, and wetting aids), adhesion promoters, thickening agents (including clays), defoamers and antifoamers, biocides, additional fillers, flow enhancers, stabilizers, crosslinking and curing agents, etc.

Examples of dispersing aids include glycol ethers (such as poly(ethylene oxide), block copolymers derived from ethylene oxide and propylene oxide (such as those sold under the trade name Pluronic® by BASF), acetylenic diols (such as 2,5,8,11-tetramethyl-6-dodecyn-5,8-diol ethoxylate and others sold by Air Products under the trade names Surfynol® and Dynol®), salts of carboxylic acids (including alkali metal and ammonium salts), and polysiloxanes.

Examples of grinding aids include stearates (such as Al, Ca, Mg, and Zn stearates) and acetylenic diols (such as those sold by Air Products under the trade names Surfynol® and Dynol®).

Examples of adhesion promoters include titanium chelates and other titanium compounds such as titanium phosphate complexes (including butyl titanium phosphate), titanate esters, diisopropoxy titanium bis(ethyl-3-oxobutanoate, isopropoxy titanium acetylacetonate, and others sold by Johnson-Matthey Catalysts under the trade name Vertec.

Examples of thickening agents include glycol ethers (such as poly(ethylene oxide), block copolymers derived from ethylene oxide and propylene oxide (such as those sold under the trade name Pluronic® by BASF), long-chain carboxylate salts (such aluminum, calcium, zinc, etc. salts of stearates, oleats, palmitates, etc.), aluminosilicates (such as those sold under the Minex® name by Unimin Specialty Minerals and Aerosil® 9200 by Evonik Degussa), fumed silica, natural and synthetic zeolites, etc.

The compositions may optionally comprise at least one "multi-chain lipid", by which term is meant a naturally-occurring or synthetic lipid having a polar head group and at least two nonpolar tail groups connected thereto. Examples of polar head groups include oxygen-, sulfur-, and halogen-containing, phosphates, amides, ammonium groups, amino acids (including α-amino acids), saccharides, polysaccharides, esters (Including glyceryl esters), zwitterionic groups, etc.

The tail groups may be the same or different. Examples of tail groups include alkanes, alkenes, alkynes, aromatic compounds, etc. They may be hydrocarbons, functionalized hydrocarbons, etc. The tail groups may be saturated or unsaturated. They may be linear or branched. The tail groups may be derived from fatty acids, such as oleic acid, palmitic acid, stearic acid, arachidic acid, erucic acid, arachadonic acid, linoleic acid, linolenic acid, oleic acid, etc.

Examples of multi-chain lipids include, but are not limited to, lecithin and other phospholipids (such as phosphoglycerides (including phosphatidylserine, phosphatidylinositol, phosphatidylethanolamine (cephalin), and phosphatidylglycerol) and sphingomyelin); glycolipids (such as glucosyl-cerebroside); saccharolipids; sphingolipids (such as ceramides, di- and triglycerides, phosphosphingolipids, and glycosphingolipids); etc. They may be amphoteric, including zwitterionic.

The compositions may optionally comprise one or more charged organic compounds. The charged organic compound comprises at least one ionic functional group and one hydrocarbon-based chain. Examples of ionic functional groups include ammonium salts, sulfates, sulphonates, phosphates, carboxylates, etc. If two or more ionic functional groups are present, they may be of the same or different types. The compound may comprise additional functional groups, including, but not limited to hydroxyls, alkenes, alkynes, carbonyl groups (such as carboxylic acids, esters, amides, ketones, aldehydes, anhydrides, thiol, etc.), ethers, fluoro, chloro, bromo, iodo, nitriles, nitrogen containing groups, phosphorous containing groups, silicon containing groups, etc.

The compound comprises at least one hydrocarbon-based chain. The hydrocarbon-based chain may be saturated or unsaturated and may be branched or linear. It may be an alkyl group, alkenyl group, alkynyl group, etc. It need not contain only carbon and hydrogen atoms. It may be substituted with other functional groups (such as those mentioned above). Other functional groups, such as esters, ethers, amides, may be present in the length of the chain. In other words, the chain may contain two or more hydrocarbon-based segments that are connected by one or more functional groups. In one embodiment, at least one ionic functional group is located at the end of a chain.

Examples of ammonium salts include materials having the formula: $R^1R^2R^3R^4N^+X^-$, where $R^1$, $R^2$, and $R^3$, are each independently H, a hydrocarbon-based chain, an aryl-containing group, an alicyclic group; an oligomeric group, a polymeric group, etc.; where $R^4$ is a hydrocarbon-based chain having at least four carbon atoms; and where $X^-$ is an anion such as fluoride, bromide, chloride, iodide, sulfate, hydroxide, carboxylate, etc. Any of the R groups may have one or more additional ammonium groups.

Examples of R groups include methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, $C_{21}$ to $C_{40}$ chains, etc.

Examples of quaternary ammonium salts include tetraalkylammonium salts, dialkyldimethylammonium salts, alkyltrimethylammonium salts, where the alkyl groups are one or more groups containing at least eight carbon atoms. Examples include tetradodecylammonium, tetradecyltrimethylammonium halide, hexadecyltrimethylammonium halide, didodecyldimethylammonium halide, etc.

Ammonium salts may be bis- or higher order ammonium salts, including quaternary ammonium salts. They may be salts of carboxylic acids, dicarboxylic acids, tricarboxylic acids, and higher carboxylic acids. The carboxylic acids may have be part of a hydrocarbon-based chain having at least about four linear carbon atoms. Examples include ammonium salts of octanoic acid, nonanoic acid, decanoic acid, undecanoic acid, dodecanoic acid, tridecanoic acid, tetradecanoic acid, pentadecanic acid, carboxylic acids having at least 15 carbon atoms, stearic acid, oleic acid, montanic acid, apidic acid, 1,7-heptanedioic acid, 1,8-octandioic acid, 1,9-nonanedioic acid, sebacic acid, 1,11-undecandioic acid, 1,12-dodecanedioic acid, 1,13-tridecanedioic acid, 1,14-tetradecanedioic acid, 1,15-pentadecanedioic acid, 1,16-hexadecanedioic acid, 1,17-heptadecanedioic acid, 1,18-octadecanedioic acid, 1,19-nonadecanedioic acid, 1,20-eicosanedioic acid, dicarboxylic acids having 21 to 40 carbon atoms, etc.

Alkylol ammonium salts of carboxylic acids (including high molecular weight carboxylic acids and unsaturated carboxylic acids) may be used. Examples include EFKA 5071, an alkylol ammonium salt of a high-molecular weight carboxylic acid supplied by Ciba and BYK-ES80, an alkylolammonium salt of an unsaturated acidic carboxylic acid ester manufactured by BYK USA, Wallingford, Conn.

The charged organic compound may have a sulfur containing group such as a sulphonate, mesylate, triflate, tosylate, besylate, sulfates, sulfite, peroxomonosulfate, peroxodisulfate, pyrosulfate, dithionate, metabisulfite, dithionite, thiosulfate, tetrathionate, etc. The organic compound may also contain two or more sulfur containing groups.

Alkyl, alkenyl, and/or alkynyl sulfates and sulphonates are preferred sulfur-containing compounds. The alkyl, alkenyl, and/or alkynyl groups preferably contain at least about 8 carbon atoms, or more preferably at least about 10 carbon atoms. Examples include decylsulfate salts, dodecylsulfate salts (such as sodium 1-dodecanesulfate (SDS)), decylsulfonate salts, dodecylsulfonate salts (such as sodium 1-dodecanesulfonate (SDSO)), etc. The counter ions may be any suitable cation, such as lithium, sodium, potassium, ammonium, etc.

The charged organic compound may be present in about 1 to about 75 weight percent, in about 2 to about 70 weight percent, in about 2 to about 60 weight percent, in about 2 to about 50 weight percent, in about 5 to about 50 weight percent, in about 10 to about 50 weight percent, in about 10 to about 40 weight percent, in about 20 to about 40 weight percent, based on the total weight of charged organic compound and graphene sheets and other carbonaceous fillers, if used.

The compositions may optionally contain additional electrically conductive components other than the graphene sheets, such as metals (including metal alloys), conductive metal oxides, polymers, carbonaceous materials other than compositions, metal-coated materials, etc. These components can take a variety of forms, including particles, powders, flakes, foils, needles, etc.

Examples of metals include, but are not limited to silver, copper, aluminum, platinum, palladium, nickel, chromium, gold, bronze, colloidal metals, etc. Examples of metal oxides include antimony tin oxide and indium tin oxide and materials such as fillers coated with metal oxides. Metal and metal-oxide coated materials include, but are not limited to metal coated carbon and graphite fibers, metal coated glass fibers, metal coated glass beads, metal coated ceramic materials (such as beads), etc. These materials can be coated with a variety of metals, including nickel.

Examples of electrically conductive polymers include, but are not limited to, polyacetylene, polyethylene dioxythiophene (PEDOT), poly(styrenesulfonate) (PSS), PEDOT: PSS copolymers, polythiophene and polythiophenes, poly (3-alkylthiophenes), poly(2,5-bis(3-tetradecylthiophen-2-yl)thieno[3,2-b]thiophene) (PBTTT), poly (phenylenevinylene), polypyrene, polycarbazole, polyazulene, polyazepine, polyflurorenes, polynaphthalene, polyisonaphthalene, polyaniline, polypyrrole, poly(phenylene sulfide), copolymers of one or more of the foregoing, etc., and their derivatives and copolymers. The conductive polymers may be doped or undoped. They may be doped with boron, phosphorous, iodine, etc.

Examples of carbonaceous materials other than graphene sheets and graphite include, but are not limited to, graphitized carbon, carbon black, carbon fibers and fibrils, carbon whiskers, vapor-grown carbon nanofibers, metal coated carbon fibers, carbon nanotubes (including single- and multi-walled nanotubes), fullerenes, activated carbon, carbon fibers, expanded graphite, expandable graphite, graphite oxide, hollow carbon spheres, carbon foams, etc.

Such as when they are in the form of coatings and inks, the compositions can be applied to a wide variety of substrates, including, but not limited to, flexible and/or stretchable materials, silicones and other elastomers and other polymeric materials, metals (such as aluminum, copper, steel, stainless steel, etc.), adhesives, fabrics (including cloths) and textiles (such as cotton, wool, polyesters, rayon, etc.), clothing, glasses and other minerals, ceramics, silicon surfaces, wood, paper, cardboard, paperboard, cellulose-based materials, glassine, labels, silicon and other semiconductors, laminates, corrugated materials, concrete, bricks, and other building materials, etc. Substrates may in the form of films, papers, wafers, larger three-dimensional objects, etc.

The substrates may have been treated with other coatings (such as paints) or similar materials before the compositions are applied. Examples include substrates (such as PET) coated with indium tin oxide, antimony tin oxide, etc. They may be woven, nonwoven, in mesh form; etc. They may be woven, nonwoven, in mesh form; etc.

The substrates may be paper-based materials generally (including paper, paperboard, cardboard, glassine, etc.). Paper-based materials can be surface treated. Examples of surface treatments include coatings such as polymeric coatings, which can include PET, polyethylene, polypropylene, acetates, nitrocellulose, etc. Coatings may be adhesives. The paper based materials may be sized.

Examples of polymeric materials include, but are not limited to, those comprising thermoplastics and thermosets, including elastomers and rubbers (including thermoplastics and thermosets), silicones, fluorinated polysiloxanes, natural rubber, butyl rubber, chlorosulfonated polyethylene, chlorinated polyethylene, styrene/butadiene copolymers (SBR), styrene/ethylene/butadiene/stryene copolymers (SEBS), styrene/ethylene/butadiene/stryene copolymers grafted with maleic anhydride, styrene/isoprene/styrene copolymers (SIS), polyisoprene, nitrile rubbers, hydrogenated nitrile rubbers, neoprene, ethylene/propylene copolymers (EPR), ethylene/propylene/diene copolymers (EPDM), ethylene/vinyl acetate copolymer (EVA), hexafluoropropylene/vinylidene fluoride/tetrafluoroethylene copolymers, tetrafluoroethylene/propylene copolymers, fluorelastomers, polyesters (such as poly(ethylene terephthalate), poly(butylene terephthalate), poly(ethylene naphthalate), liquid crystalline polyesters, poly(lactic acid), etc); polystyrene; polyamides (including polyterephthalamides); polyimides (such as Kapton®); aramids (such as Kevlar® and Nomex®); fluoropolymers (such as fluorinated ethylene propylene (FEP), polytetrafluoroethylene (PTFE), poly(vinyl fluoride), poly(vinylidene fluoride), etc.); polyetherimides; poly(vinyl chloride); poly(vinylidene chloride); polyurethanes (such as thermoplastic polyurethanes (TPU); spandex, cellulosic polymers (such as nitrocellulose, cellulose acetate, etc.); styrene/acrylonitriles polymers (SAN); arcrylonitrile/butadiene/styrene polymers (ABS); polycarbonates; polyacrylates; poly(methyl methacrylate); ethylene/vinyl acetate copolymers; thermoset epoxies and polyurethanes; polyolefins (such as polyethylene (including low density polyethylene, high density polyethylene, ultrahigh molecular weight polyethylene, etc.), polypropylene (such as biaxially-oriented polypropylene, etc.); Mylar; etc. They may be non-woven materials, such as DuPont Tyvek®. They may be adhesive or adhesive-backed materials (such as adhesive-backed papers or paper substitutes). They may be mineral-based paper substitutes such as Teslin® from PPG Industries. The substrate may be a transparent or translucent or optical material, such as glass, quartz, polymer (such as polycarbonate or poly(meth)acrylates (such as poly(methyl methacrylate).

The compositions may be applied to the substrate using any suitable method, including, but not limited to, painting, pouring, spin casting, solution casting, dip coating, powder coating, by syringe or pipette, spray coating, curtain coating, lamination, co-extrusion, electrospray deposition, ink-jet printing, spin coating, thermal transfer (including laser transfer) methods, doctor blade printing, screen printing, rotary screen printing, gravure printing, lithographic printing, intaglio printing, digital printing, capillary printing, offset printing, electrohydrodynamic (EHD) printing (a method of which is described in WO 2007/053621, which is hereby incorporated herein by reference), microprinting, pad printing, tampon printing, stencil printing, wire rod coating, drawing, flexographic printing, stamping, xerography, microcontact printing, dip pen nanolithography, laser printing, via pen or similar means, etc. The compositions can be applied in multiple layers.

After they have been applied to a substrate, the coatings may be cured using any suitable technique, including drying and oven-drying (in air or another inert or reactive atmosphere), UV curing, IR curing, drying, crosslinking, thermal curing, laser curing, IR curing, microwave curing or drying, sintering, and the like.

In some embodiments, the curing may be thermal curing and may take place at a temperature of no more than about 135° C., or no more than about 120° C., or no more than about 110° C., or no more than about 100° C., or no more than about 90° C., or no more than about 80° C., or no more than about 70° C.

The coated substrate can be electrically conductive. It can have a conductivity of at least about $10^{-8}$ S/m. It can have a conductivity of about $10^{-6}$ S/m to about $10^5$ S/m, or of about $10^{-5}$ S/m to about $10^5$ S/m. In other embodiments of the invention, the coating has conductivities of at least about 0.001 S/m, of at least about 0.01 S/m, of at least about 0.1 S/m, of at least about 1 S/m, of at least about 10 S/m, of at least about 100 S/m, or at least about 1000 S/m, or at least about 10,000 S/m, or at least about 20,000 S/m, or at least about 30,000 S/m, or at least about 40,000 S/m, or at least about 50,000 S/m, or at least about 60,000 S/m, or at least about 75,000 S/m, or at least about $10^5$ S/m, or at least about $10^6$ S/m.

In some embodiments, the surface resistivity of the coated substrate may be no greater than about 10000 Ω/square, or no greater than about 5000 Ω/square, or no greater than about 1000 Ω/square or no greater than about 700 Ω/square, or no greater than about 500 Ω/square, or no greater than about 350 Ω/square, or no greater than about 200 Ω/square, or no greater than about 200 Ω/square, or no greater than about 150 Ω/square, or no greater than about 100 Ω/square, or no greater than about 75 Ω/square, or no greater than about 50 Ω/square, or no greater than about 30 Ω/square, or no greater than about 20 Ω/square, or no greater than about 10 Ω/square, or no greater than about 5 Ω/square, or no greater than about 1 Ω/square, or no greater than about 0.1 Ω/square, or no greater than about 0.01 Ω/square, or no greater than about 0.001 Ω/square.

The coated substrate can have a thermal conductivity of about 0.1 to about 50 W/(m-K), or of about 0.5 to about 30 W/(m-K), or of about 1 to about 30 W/(m-K), or of about 1 to about 20 W/(m-K), or of about 1 to about 10 W/(m-K), or of about 1 to about 5 W/(m-K), or of about 2 to about 25 W/(m-K), or of about 5 to about 25 W/(m-K).

When applied to a substrate, the compositions can have a variety of thicknesses. In one embodiment, when applied to a substrate, after curing the coating can optionally have a thickness of at least about 2 nm, or at least about 5 nm. In various embodiments, the coatings can optionally have a thickness of about 2 nm to 2 mm, about 5 nm to 1 mm, about 2 nm to about 100 nm, about 2 nm to about 200 nm, about 2 nm to about 500 nm, about 2 nm to about 1 micrometer, about 5 nm to about 200 nm, about 5 nm to about 500 nm, about 5 nm to about 1 micrometer, about 5 nm to about 50 micrometers, about 5 nm to about 200 micrometers, about 10 nm to about 200 nm, about 50 nm to about 500 nm, about 50 nm to about 1 micrometer, about 100 nm to about 10 micrometers, about 1 micrometer to about 2 mm, about 1 micrometer to about 1 mm, about 1 micrometer to about 500 micrometers, about 1 micrometer to about 200 micrometers, about 1 micrometer to about 100 micrometers, about 50 micrometers to about 1 mm, about 100 micrometers to about 2 mm, about 100 micrometers to about 1 mm, about 100 micrometers to about 750 micrometers, about 100 micrometers to about 500 micrometers, about 500 micrometers to about 2 mm, or about 500 micrometers to about 1 mm.

When applied to a substrate, the compositions can have a variety of forms. They can be present as a film or lines, patterns, letters, numbers, circuitry, logos, identification tags, and other shapes and forms. The coatings may be covered in whole or in part with additional material, such as overcoatings, varnishes, polymers, fabrics, etc.

The compositions can be applied to the same substrate in varying thicknesses at different points and can be used to build up three-dimensional structures on the substrate.

The compositions can be used for the passivation of surfaces, such as metal (e.g. steel, aluminum, etc.) surfaces, including exterior structures such as bridges and buildings. Examples of other uses of the compositions include: UV radiation resistant coatings, abrasion resistant coatings, coatings having permeation resistance to liquids (such as hydrocarbon, alcohols, water, etc.) and/or gases, electrically conductive coatings, static dissipative coatings, and blast and impact resistant coatings. They can be used to make fabrics having electrical conductivity. The compositions can be used in solar cell applications; solar energy capture applications; signage, flat panel displays; flexible displays, including light-emitting diode, organic light-emitting diode, and polymer light-emitting diode displays; backplanes and frontplanes for displays; and lighting, including electroluminescent and OLED lighting. The displays may be used as components of portable electronic devices, such as computers, cellular telephones, games, GPS receivers, personal digital assistants, music players, games, calculators, artificial "paper" and reading devices, etc.

They may be used in packaging and/or to make labels. They may be used in inventory control and anti-counterfeiting applications (such as for pharmaceuticals), including package labels. They may be used to make smart packaging and labels (such as for marketing and advertisement, information gathering, inventory control, information display, etc.). They may be used to form a Faraday cage in packaging, such as for electronic components.

The compositions can be used on electrical and electronic devices and components, such as housings etc., to provide EMI shielding properties. They made be used in microdevices (such as microelectromechanical systems (MEMS) devices) including to provide antistatic coatings.

They may be used in the manufacture of housings, antennas, and other components of portable electronic devices, such as computers, cellular telephones, games, navigation systems, personal digital assistants, music players, games, calculators, radios, artificial "paper" and reading devices, etc.

The compositions can be used to form thermally conductive channels on substrates or to form membranes having desired flow properties and porosities. Such materials could have highly variable and tunable porosities and porosity gradients can be formed. The coatings can be used to form articles having anisotropic thermal and/or electrical conductivities. The coatings can be used to form three-dimensional printed prototypes.

The compositions can be used to make printed electronic devices (also referred to as "printed electronics) that may be in the form of complete devices, parts or sub elements of devices, electronic components, etc.

Printed electronics may be prepared by applying the compositions to the substrate in a pattern comprising an electrically conductive pathway designed to achieve the desired electronic device. The pathway may be solid, mostly solid, in a liquid or gel form, etc.

The printed electronic devices may take on a wide variety of forms and be used in a large array of applications. They may contain multiple layers of electronic components (e.g. circuits) and/or substrates. All or part of the printed layer(s) may be covered or coated with another material such as a cover coat, varnish, cover layer, cover films, dielectric coatings, electrolytes and other electrically conductive materials, etc. There may also be one or more materials between the substrate and printed circuits. Layers may include semiconductors, metal foils, dielectric materials, etc.

The printed electronics may further comprise additional components, such as processors, memory chips, other microchips, batteries, resistors, diodes, capacitors, transistors, etc.

Other applications include, but are not limited to: passive and active devices and components; electrical and electronic circuitry, integrated circuits; flexible printed circuit boards; transistors; field-effect transistors; microelectromechanical systems (MEMS) devices; microwave circuits; antennas; diffraction gratings; indicators; chipless tags (e.g. for theft deterrence from stores, libraries, etc.); security and theft deterrence devices for retail, library, and other settings; key pads; smart cards; sensors; liquid crystalline displays (LCDs); signage; lighting; flat panel displays; flexible displays, including light-emitting diode, organic light-emitting diode, and polymer light-emitting diode displays; backplanes and frontplanes for displays; electroluminescent and OLED lighting; photovoltaic devices, including backplanes; product identifying chips and devices; membrane switches, batteries, including thin film batteries; electrodes; indicators; printed circuits in portable electronic devices (for example, cellular telephones, computers, personal digital assistants, global positioning system devices, music players, games, calculators, etc.); electronic connections made through hinges or other movable/bendable junctions in electronic devices such as cellular telephones, portable computers, folding keyboards, etc.); wearable electronics; and circuits in vehicles, medical devices, diagnostic devices, instruments, etc.

The electronic devices may be radiofrequency identification (RFID) devices and/or components thereof and/or radiofrequency communication device. Examples include, but are not limited to, RFID tags, chips, and antennas. The RFID devices may be ultrahigh frequency RFID devices, which typically operate at frequencies in the range of about 868 to about 928 MHz. Examples of uses for RFIDs are for tracking shipping containers, products in stores, products in transit, and parts used in manufacturing processes; passports; barcode replacement applications; inventory control applications; pet identification; livestock control; contactless smart cards; automobile key fobs; etc.

The electronic devices may also be elastomeric (such as silicone) contact pads and keyboards. Such devices can be used in portable electronic devices, such as calculators, cellular telephones, GPS devices, keyboards, music players, games, etc. They may also be used in myriad other electronic applications, such as remote controls, touch screens, automotive buttons and switches, etc.

EXAMPLES

Unless otherwise stated, the surface resistivities are measured using a Guardian Manufacturing Inc. SRM-232 surface resistivity meter. The results are given in Tables 1-4. Adhesion is evaluated by firmly applying a piece of Scott® Magic® tape to the surface and peeling it off. A rating of "1" means that the peeled tape is completely dark. A rating of "2" means that the peeled tape surface contains completely dark regions with a few regions where it is grey. A rating of "3" means that the peeled tape surface appears to be have at least about 30 percent grey regions and no more than about 70 percent completely dark regions.

Examples 1-13 and Comparative Examples 1-10

Graphene sheets (about 20 weight percent) and graphite (about 80 weight percent) are ground in a vertical grinding mill with 3/16" stainless steel grinding media in isopropyl alcohol. The resulting pigment is combined with an Elvacite® 2028, a methacrylate copolymer supplied by Lucite International in a pigment to polymer weight ratio of 4:1. One or more additional solvents are added to bring the compositions to the solids (pigment and polymer) concentration indicated in Tables 1-3. The amounts of each solvent used are also indicated in the tables.

The resulting formulations are printed onto uncoated poly(ethylene terephthalate) films in the case of Examples 1-2 and 12-13 and Comparative Examples 1-6 and on poly(ethylene terephthalate) coated paperboard in the case of Examples 3-11 and Comparative Examples 7-10. The prints are cured in an infrared oven at 80° C. for about 1 minute in the case of Examples 1-11 and Comparative Examples 1-10 and for about 2 minutes in the case of Examples 12-13. The results are given in the tables.

Examples 14-18 and Comparative Example 11

Graphene sheets (about 20 weight percent) and graphite (about 80 weight percent) are ground in a bead mill in hexanol. The resulting pigment is combined with poly(vinyl butyral) in pigment to polymer weight ratio of 4:1. One or more additional solvents are added to bring the compositions to the solids (pigment and polymer) concentration indicated in Table 4. The amounts of each solvent used are also indicated in the table.

The resulting formulations are screen printed onto uncoated poly(ethylene terephthalate) films and are cured in an infrared oven at 130° C. for about 6 minutes.

The results are given in Table 4. Resistivity measurements are the averages of measurements taken on several prints.

Examples 19-21 and Comparative Example 12-16

Graphene sheets (about 20 weight percent), graphite (about 80 weight percent), and solver flakes are ground in a vertical grinding mill with 3/16" stainless steel grinding media in hexanol. The relative proportions of carbon (graphene sheets and graphite) and silver are indicated in Table 5. The resulting pigment is combined with poly(vinyl butyral) in pigment to polymer weight ratio of 4:1. One or more additional solvents are added to bring the compositions to the solids (pigment and polymer) concentration indicated in Table 5. The amounts of each solvent used are also indicated in the table.

The resulting formulations are screen printed onto uncoated poly(ethylene terephthalate) films and are cured in an infrared oven at 130° C. for about 6 minutes. The results are given in Table 5. The surface resistivities are determined by measuring 100 and 50 square lines using an ohmmeter. Resistivity measurements are the averages of measurements taken on several prints.

TABLE 1

|  | Comp. Ex. 1 | Comp. Ex. 2 | Comp. Ex. 3 | Ex. 1 | Comp. Ex. 4 | Comp. Ex. 5 | Comp. Ex. 6 | Ex. 2 |
| --- | --- | --- | --- | --- | --- | --- | --- | --- |
| Solids | 7.3 | 7.3 | 7.3 | 7.3 | 7.3 | 7.3 | 7.3 | 7.3 |
| IPA | 92.7 | 82.7 | 82.7 | 82.7 | 74.7 | 64.7 | 64.7 | 64.7 |
| nBuOAc | — | — | — | — | 18 | 18 | 18 | 18 |
| nBuOH | — | 10 | — | — | — | 10 | — | — |
| Diglyme | — | — | 10 | — | — | — | 10 | — |
| γ-Butyrolactone | — | — | — | 10 | — | — | — | 10 |
| Surface resistivity (Ω/square) | 134 | 66 | 41 | 34 | 45 | 56 | 40 | 35 |
| Adhesion | 1 | 1 | 2 | 3 | 1 | 1 | 2 | 3 |

Ingredient amounts are in weight percent based on the total weight of the composition.

TABLE 2a

|  | Comp. Ex. 7 | Ex. 3 | Ex. 4 | Comp. Ex. 8 | Ex. 5 | Ex. 6 |
| --- | --- | --- | --- | --- | --- | --- |
| Solids | 5.0 | 5.0 | 5.0 | 5.0 | 5.0 | 4.9 |
| IPA | 95.0 | 84.8 | 75.0 | 85.0 | 75.2 | 64.7 |
| nBuOAc | — | — | — | — | — | — |
| nBuOH | — | — | — | 10.0 | 9.9 | 10.0 |
| γ-Butyrolactone | — | 10.2 | 20.0 | — | 9.9 | 20.4 |
| Surface resistivity (Ω/square) | 233 | 74 | 68 | 91 | 54 | 60 |
| Adhesion | 1 | 3 | 3 | 1 | 3 | 3 |

Ingredient amounts are in weight percent based on the total weight of the composition.

TABLE 2b

|  | Comp. Ex.9 | Ex. 7 | Ex. 8 | Comp. Ex. 10 | Ex. 9 | Ex. 10 | Ex. 11 |
| --- | --- | --- | --- | --- | --- | --- | --- |
| Solids | 5.0 | 5.0 | 4.9 | 5.0 | 4.9 | 5.0 | 4.9 |
| IPA | 75.1 | 64.7 | 54.2 | 64.9 | 54.4 | 44.9 | 55.8 |
| nBuOAc | — | — | — | — | — | — | 10.9 |
| nBuOH | 20.0 | 19.9 | 19.8 | 30.1 | 30.8 | 30.3 | 19.8 |
| γ-Butyrolactone | — | 10.4 | 21.1 | — | 9.9 | 19.8 | 9.7 |
| Surface resistivity (Ω/square) | 102 | 61 | 59 | 138 | 46 | 60 | 79 |
| Adhesion | 1 | 2 | 3 | 1 | 3 | 3 | 2 |

Ingredient amounts are in weight percent based on the total weight of the composition.

TABLE 3

|  | Ex. 12 | Ex. 13 |
| --- | --- | --- |
| Solids | 5 | 5 |
| IPA | 74.6 | 74.4 |
| nBuOAc | 5.2 | 5.3 |
| NMP | — | 5.1 |
| γ-Butyrolactone | 15.3 | 10.2 |
| Surface resistivity (Ω/square) | 39 | 31 |
| Adhesion | 3 | 3 |

Ingredient amounts are in weight percent based on the total weight of the composition.

TABLE 4

|  | Ex. 14 | Ex. 15 | Ex. 16 | Ex. 17 | Ex. 18 | Comp. Ex. 11 |
| --- | --- | --- | --- | --- | --- | --- |
| Solids | 15.6 | 15.6 | 15.6 | 15.6 | 15.6 | 15.6 |
| nHexOH | 77.4 | 72.4 | 67.4 | 53.4 | 53.2 | 84.4 |
| NMP | 7 | 12 | 17 | 31 | 7 | — |
| α-Terpineol | — | — | — | — | 24.2 | — |
| Surface resistivity (Ω/square) | 38 | 36 | 33 | 34 | 37 | 84 |
| Adhesion | 3 | 3 | 3 | 3 | 3 | 2 |

Ingredient amounts are in weight percent based on the total weight of the composition.

TABLE 5

|  | Ex. 19 | Comp. Ex. 12 | Ex. 20 | Comp. Ex. 13 | Ex. 21 | Comp. Ex. 14 | Comp. Ex. 15 | Comp. Ex. 16 |
| --- | --- | --- | --- | --- | --- | --- | --- | --- |
| Silver | 5.3 | 5.3 | 9.2 | 9.2 | 17.1 | 17.3 | 36 | 36 |
| Carbon | 12.3 | 12.3 | 9.2 | 9.2 | 7.3 | 7.4 | — | — |
| Binder | 4.4 | 4.4 | 4.6 | 4.6 | 6.1 | 6.2 | 9 | 9 |
| Hexanol | 58.1 | 78 | 57.1 | 77.1 | 49.4 | 69.1 | 35 | 55 |
| NMP | 20 | — | 20 | — | 20 | — | 20 | — |
| Surface resistivity (Ω/square) | 14 | 34 | 15 | 29 | 1.2 | 1.2 | 0.3 | 0.3 |
| Adhesion | 1 | 1 | 3 | 2 | 3 | 3 | 3 | 3 |

Ingredient amounts are in weight percent based on the total weight of the composition.

The invention claimed is:

1. A composition comprising:
   graphene sheets;
   graphite;
   at least one binder;
   a carrier system;
   wherein about 1 to about 50 weight percent of the carrier system comprises at least one of a cyclic imide and a lactone;
   wherein the graphene sheets completely comprise fully exfoliated single sheets of graphite; and
   and wherein the ratio by weight of graphite to graphene sheets is from about 50:50 to about 85:15.

2. The composition of claim 1, wherein the carrier system comprises about 1 to about 40 weight percent of at least one of a cyclic imide and a lactone.

3. The composition of claim 1, wherein the carrier system comprises about 3 to about 40 weight percent of at least one of a cyclic imide and a lactone.

4. The composition of claim 1, wherein the binder consists of at least one of an acrylate polymer, a polyamide, and a poly(vinyl butyral).

5. The composition of claim 1, further comprising silver.

6. The composition of claim 1, wherein the graphene sheets have a surface area of at least about 400 $m^2/g$.

7. The composition of claim 1, wherein the graphene sheets have a surface area of at least about 500 $m^2/g$.

8. The composition of claim 1, wherein the graphene sheets have a carbon to oxygen molar ratio of at least about 10:1.

9. The composition of claim 1, wherein the graphene sheets have a carbon to oxygen molar ratio of at least about 25:1.

10. The composition of claim 1, wherein the graphene sheets have a carbon to oxygen molar ratio of at least about 75:1.

11. The composition of claim 1 in the form of an ink or coating.

12. The composition of claim 1, wherein from about 1 to about 30 weight percent of the carrier system comprises at least one of a cyclic imide and a lactone.

13. The composition of claim 1, wherein from about 5 to about 40 weight percent of the carrier system comprises at least one of a cyclic imide and a lactone.

14. The composition of claim 1, wherein from about 5 to about 30 weight percent of the carrier system comprises at least one of a cyclic imide and a lactone.

* * * * *